(12) United States Patent
VanOrman

(10) Patent No.: US 7,085,727 B2
(45) Date of Patent: Aug. 1, 2006

(54) MOVIE RENTAL AND NOTIFICATION SYSTEM

(76) Inventor: Stacy L. VanOrman, PMB #252, P.O. Box 1200, Alpena, MI (US) 49707

( * ) Notice: Subject to any disclaimer, the term of this patent is extended or adjusted under 35 U.S.C. 154(b) by 624 days.

(21) Appl. No.: 10/255,528

(22) Filed: Sep. 26, 2002

(65) Prior Publication Data

US 2004/0064347 A1    Apr. 1, 2004

(51) Int. Cl.
*G06Q 10/00*    (2006.01)

(52) U.S. Cl. .................. 705/5; 364/479.01; 235/381; 194/205; 705/8

(58) Field of Classification Search .................. 705/5, 705/6
See application file for complete search history.

(56) References Cited

U.S. PATENT DOCUMENTS

| | | | |
|---|---|---|---|
| 4,554,418 A | | 11/1985 | Toy |
| 4,577,062 A | | 3/1986 | Hilleary et al. |
| 4,931,932 A | * | 6/1990 | Dalnekoff et al. ............. 705/5 |
| 4,975,841 A | * | 12/1990 | Kehnemuyi et al. .......... 705/32 |
| 5,088,586 A | * | 2/1992 | Isobe et al. .................. 194/205 |
| 5,095,195 A | | 3/1992 | Harman et al. |
| 5,644,624 A | | 7/1997 | Caldwell |
| 5,898,594 A | * | 4/1999 | Leason et al. ............. 700/231 |
| 6,009,149 A | | 12/1999 | Langsenkamp |
| 6,055,505 A | | 4/2000 | Elston |
| 6,067,348 A | | 5/2000 | Hibbeler |
| 6,167,127 A | | 12/2000 | Smith et al. |
| 2003/0004772 A1 | * | 1/2003 | Dutta et al. ................. 705/8 |
| 2005/0080510 A1 | * | 4/2005 | Bates et al. ............... 700/241 |
| 2005/0187833 A1 | * | 8/2005 | Royer et al. ............... 705/28 |

FOREIGN PATENT DOCUMENTS

JP    1-158593    *    6/1989

OTHER PUBLICATIONS

Dialog Search. Graham, Jefferson. DVD rentals without late fees, USA Today (p. 03D), Jun. 19, 2001.*
Rosenblum, Debbie, Feb. 1986. Unique Computer Features Yield Systems to Fit Each Store's Needs. Merchandising, v11, p. 21.*

* cited by examiner

*Primary Examiner*—John W. Hayes
*Assistant Examiner*—Shannon Saliard
(74) *Attorney, Agent, or Firm*—Dale J. Ream

(57) ABSTRACT

An automated movie rental and notification system includes a computer having a movie database containing hold and reservation lists and movie records. The system receives rental requests, each request including a selected movie title, reservation mode, reservation time, and submitter contact information. If the reservation mode is a hold mode, the request is added to the hold list. If the mode is a reserve mode and the selected title will be available by the selected reservation time, then the request is added to the reserve list. When the movie title is available, submitters of the hold list requests associated with that title are successively contacted using respective submitter information to inform the submitter of availability until a positive response is returned from a submitter. Requests on the reserve list are selected for contact a predetermined amount of time before the selected reservation time.

10 Claims, 9 Drawing Sheets

Customer Movie Request Routine

Store Computer Hardware

Main Menu Routine

Reservation Processing Routine

Hold Processing Routine

Check Reservations Routine

Notify Customer Routine

MOVIE RENTAL AND NOTIFICATION SYSTEM

BACKGROUND OF THE INVENTION

This invention relates generally to movie rental systems and, more particularly, to a computer-implemented rental and automated notification system that maximizes the flow and turnover of movie rentals.

Renting movies from a movie rental store for viewing at home is a popular and convenient form of entertainment. However, continually checking and re-checking a video store for the availability of a popular movie title can be inconvenient and frustrating. Even movie rental stores that allow movie titles to be reserved cause inconvenience to the store proprietors in that they must spend an inordinate amount of time processing reservation requests and notifying the requesters of present availability.

Therefore, it would be desirable to have a computer-implemented movie rental system accessible to consumers that is capable of receiving various modes of movie reservation requests from consumers. Further, it would be desirable to have a computer-implemented movie rental system that automatically notifies submitters of rental requests when a requested movie is available. In addition, it is desirable to have a movie rental system that automatically performs administrative tasks such as movie reservation verifications and submitter response processing.

SUMMARY OF THE INVENTION

Accordingly, a movie rental and notification system according to the present invention includes a computer having a central processing unit (CPU) that is connected to a wide area computer network such as the Internet. The computer includes a movie database connected to the CPU which includes at least a hold list, a reservation list, and a plurality of movie records. Each movie record is associated with a particular movie title and includes at least a present inventory status data field. The CPU, under the control of program instructions, is capable of receiving movie rental requests from a consumer, e.g. via network access or otherwise. A movie request includes data associated with a selected movie, a selected reservation mode, a selected reservation time, and submitter contact information. If the reservation mode is a "hold" mode, then the request is added to the hold list such that the submitter may be contacted when that movie title becomes available. When available, the submitters on the hold list for that movie title are contacted in sequential order until contact is successfully made with and a predetermined response is received from one of the submitters.

If the reservation mode is a "reserve" mode, then the rental request is added to the reservation list. Each rental request on the reserve list is contacted according to the respective submitter contact information a predetermined amount of time before the selected reservation time. Depending on the particular movie record, a confirmation of the reservation request may be required or else the reservation canceled. Both the hold and reservation modes operate to maximize the turnover of movie rentals, to maximize the chances that particular movies are rented as frequently as possible, and to minimize the amount of time a movie remains at the store between rentals.

Therefore, a general object of this invention is to provide a movie rental and notification system which maximizes the turnover of movie rentals by minimizing the time between rentals.

Another object of this invention is to provide a system, as aforesaid, which allows a user to submit a movie rental request in either a hold or reserve mode.

Still another object of this invention is to provide a system, as aforesaid, which sequentially notifies the submitters of hold-mode movie rental requests associated with a selected movie when that movie becomes available until one of the submitters responds positively to the notification.

Yet another object of this invention is to provide a system, as aforesaid, which automatically contacts submitters of reserve-mode movie rental requests a predetermined amount of time before a selected reservation time.

A further object of this invention is to provide a system, as aforesaid, which removes particular rental requests from the hold or reserve lists according to predetermined criteria so as to maximize daily movie rentals.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

A computer-implemented movie rental and notification system according to a preferred embodiment of the present invention will now be described in detail with reference to FIGS. 1A through 9 of the accompanying drawings.

The system includes a relational database operating in an open systems environment accessible by any computer system connected to a wide area computer network such as the Internet. More particularly, the relational database is a movie database operated within a computer 10 under the control of a central processing unit (CPU) 12 according to a plurality of program instructions. The movie database includes at least a hold list, a reservation list, and a plurality of movie records (FIG. 4). Each movie record is associated with a particular movie title and includes a present inventory status data field for tracking whether the particular movie title is presently available for rent from the movie store. Of course, the system is capable of querying other allied movie stores for availability status. Each record may also include a request confirmation field which may be set by the rental store administration, as to be further discussed later. While some data fields will be discussed in detail, the database may include many additional classes and data fields by which the presently described system could be implemented by one of ordinary skill in the art, such as an object-oriented computer programmer.

Figure 1A:
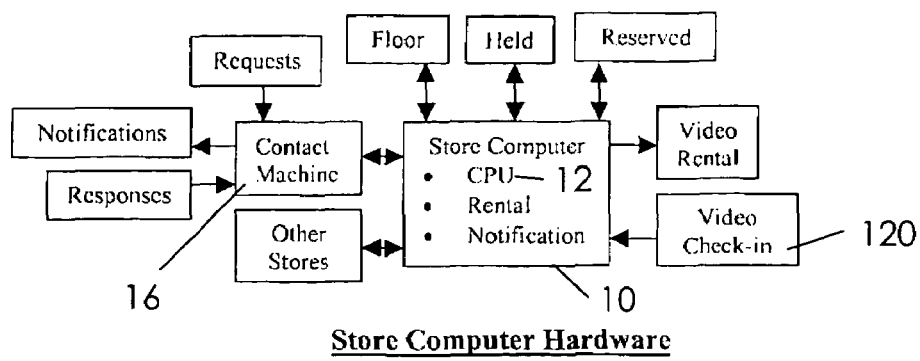
FIG. 1A is a block diagram of the physical components of a movie rental and notification system according to a preferred embodiment of the present invention.

Further, the present system is capable of receiving rental requests from users. Preferably, rental requests 14 are received from a submitter's computer via the network connection with the system computer 10 (FIG. 1A). However, rental requests 14 may also be received through contact between a submitter's telephone and a system calling machine 16 that is electrically connected to the system computer 10. The calling machine 16 is capable of receiving requests using touch tone menus, the requests being stored within the computer's memory for processing under CPU 12 control. Requests may also be submitted by electronic mail. Of course, manual contact with a store clerk who inputs the request into the system is still an option.

Figure 1B:
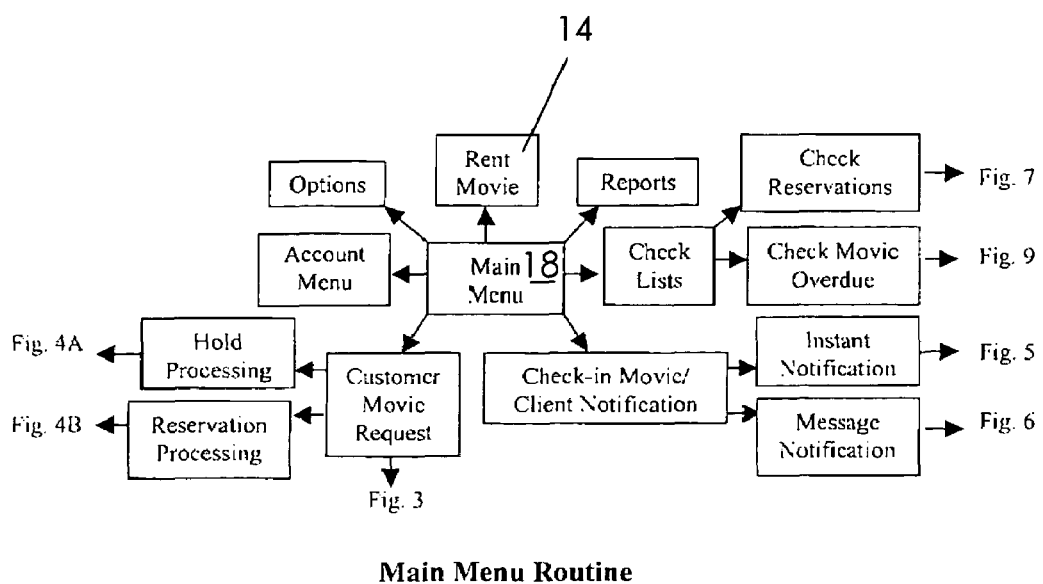
FIG. 1B is a flowchart of the overall program logic implemented by the system as in FIG. 1A.
Figure 3:
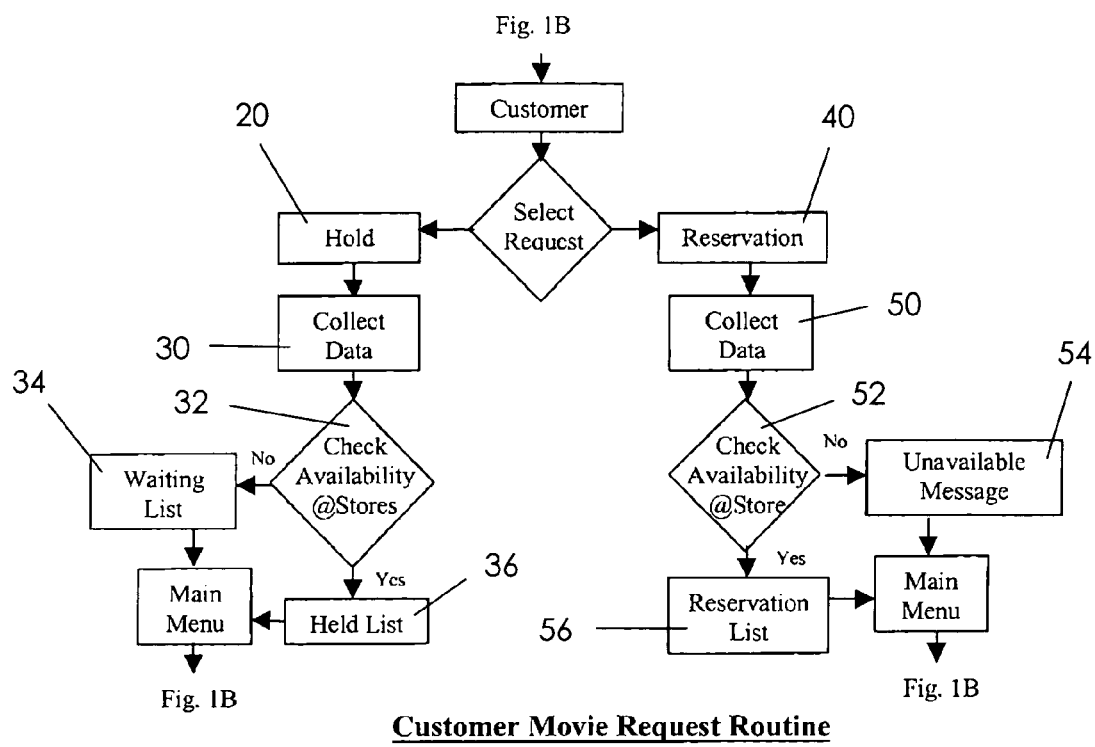
FIG. 3 is a flowchart of the program logic of a movie rental request module referenced in FIG. 1B.
Figure 4A:
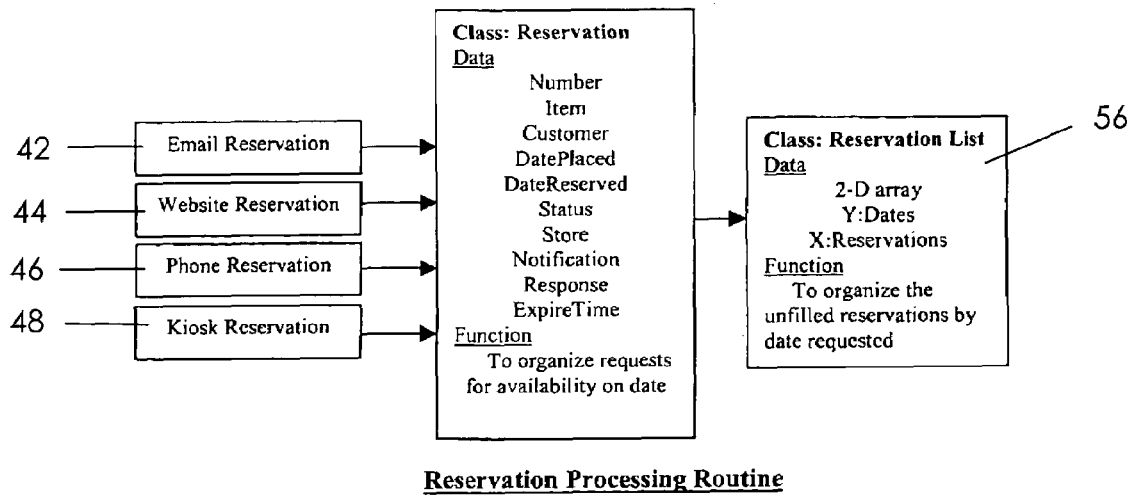
FIG. 4A is a schematic flowchart of the program logic of a reserve mode rental request.
Figure 4B:
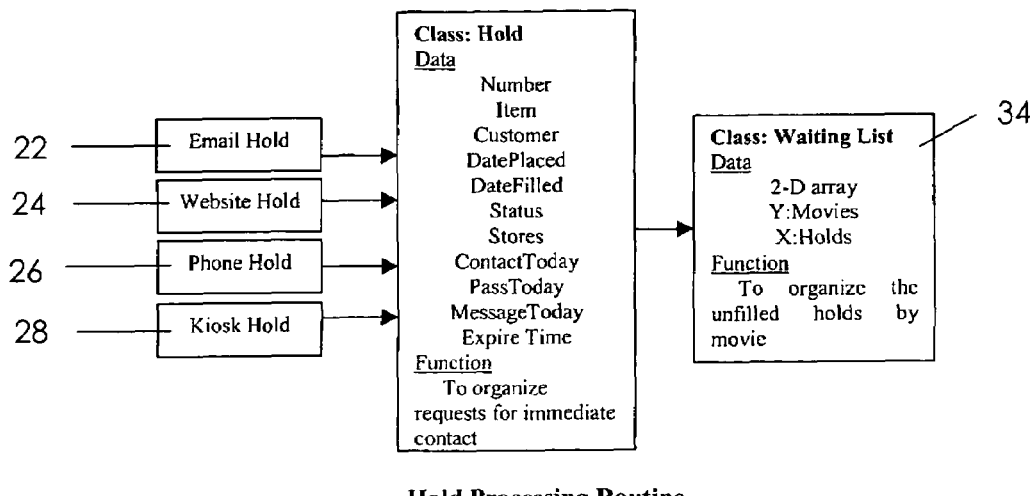
FIG. 4B is a schematic flowchart of the program logic of a hold mode rental request.

A rental request 14 includes at least data fields corresponding to a selected movie title, a selected reservation mode, a selected reservation time, and submitter contact information. A user accessing the system by computer may select the option of making a movie rental request 14 from a main menu 18 (FIG. 1B). The system logic associated with processing a rental request is shown in FIG. 3. The user (also referred to as the rental request submitter) is given the option of choosing a "hold" mode request 20 or a "reserve" mode request 40 (FIG. 3). FIG. 4A shows that a reserve mode request may be placed by e-mail 42, website 44, telephone 46, or kiosk 48 (i.e. direct contact with clerk). FIG. 4B shows that a hold mode request may be made by e-mail 22, website 24, telephone 26, or kiosk 28.

In either the hold or reservation modes, the system obtains relevant contact information 30, 50 as to how to later contact the submitter regarding movie availability, reservation confirmation, etc. (FIG. 3). This information may include a phone number, e-mail address, or the like. Also in either case, the system checks the availability 32, 52 of the selected movie title. The availability may first be checked by checking the respective present inventory status of the corresponding movie record in the movie database. In a networked implementation, the store's computer 10 may communicate via the Internet with computers at partnering stores and access corresponding movie records to determine availability.

In the case of a hold mode rental request 20, the system essentially adds the hold mode rental request 20 to a hold list. However, if the movie title is not yet available, the hold list remains in a wait state and may be referred to as a waiting list 34 (FIG. 3). Program control may be returned to the main menu 18. When the selected movie title is available, the hold mode rental request 20 is processed as to be described more fully below. Whether previously on the so-called waiting list 34 or if the movie title was immediately available, the hold mode rental request 20 is now processed as being on the movie-available-hold-list 36 (FIG. 3). Once a hold mode rental request is processed, program control returns to the main menu 18.

An overview of the hold mode rental request processing module is shown in FIG. 4B. The waiting list 34 may be implemented as a two-dimension array data structure which may be sorted by respective movie titles. Each hold mode rental request also includes a plurality of data fields having information that may be collected at the time of request submittal or supplied by the system as processing proceeds. When a movie is checked in, as to be described more fully later, the system checks the waiting list 34 to see if there are any requests for the now-available movie title and selects a respective subset of requests for notification. It is understood that predetermined movie records will be designated for "instant" notification while others will be designated for "message" notification. For example, popular rentals will utilize instant notification so as to optimize the rental frequency of that movie while less popular movie titles will allow for a slower means of notification and rental.

Figure 5:
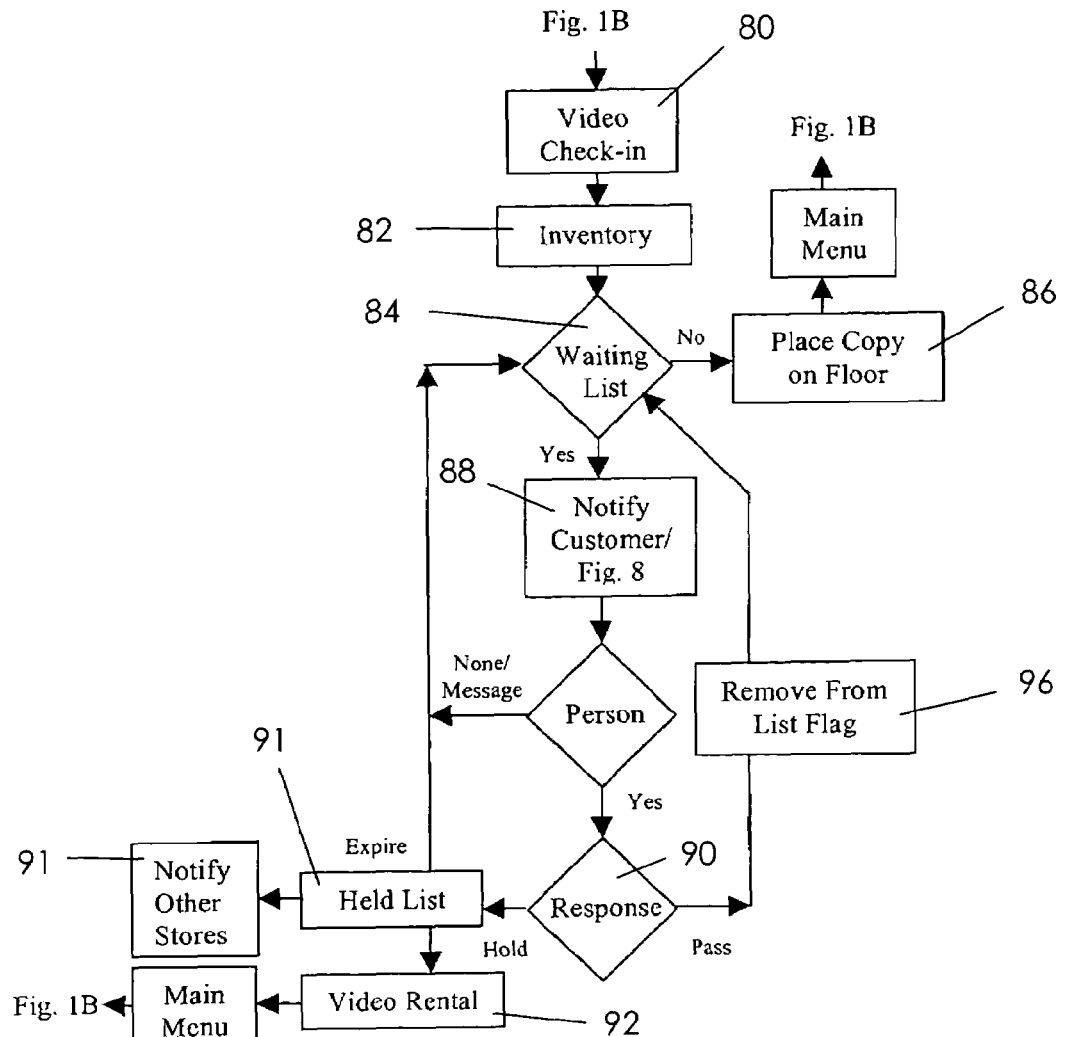
FIG. 5 is a flowchart of the program logic of an instant notification module for a hold mode rental request.

The system includes a program module for instant notification (FIG. 5). Upon return and check-in 80 of a movie title, the present inventory data field of the movie record associated therewith is updated 82 on the movie database. The system then automatically checks 84 the waiting list (i.e. the requests on a hold list but under a wait status), to see if the newly checked in movie title has been requested. If there is no match, then the system will alert a clerk to reshelve the movie title, as indicated at block 86 of FIG. 5. However, if there are one or more requests for the movie title, then all waiting requests therefor are selected for instant notification 88 of the customer according to FIG. 8.

Figure 8:
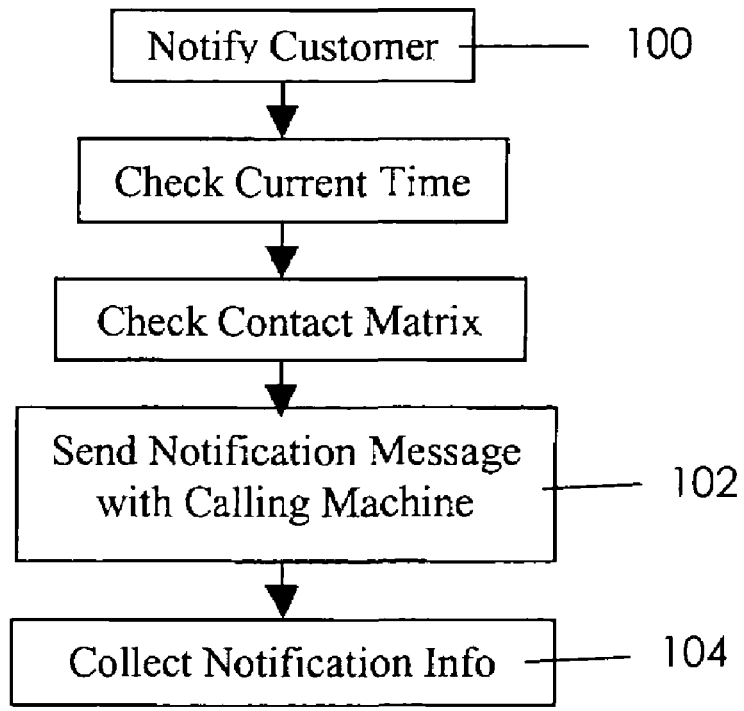
FIG. 8 is a flowchart of a calling machine customer notification module.

According to FIG. 8, an automated calling machine 16 connected to the computer and controlled by the CPU 12 initiates a call to the submitter of a first selected request for the selected movie title using contact information supplied by the submitter at the time the request was made. The system also includes a message database having a plurality of messages associated with the plurality of movie records, each message being indicative of an availability. When a connection is established in order to notify a customer 100, a playback module associated with the calling machine 16 delivers a message 102 indicative of an availability of the selected movie title and solicits a predetermined response 104, such as a certain telephone touch tone. The system then evaluates 90 that response. If a positive response, e.g. a "hold" response, is received (FIG. 5), then the movie title is placed on another list 91 indicating that it will be held at the rental store counter for example, until the submitter arrives to actually rent it 92. Correspondingly, the present inventory status data field of the corresponding movie record is updated and all partnering stores are notified of the status 94. However, if no connection with the submitter was made or a response other than the predetermined "hold" response is received, then the system selects the next respective request for the subject movie title and goes through the contact procedure again. This process of successively contacting respective hold mode rental requests for a selected movie title continues until the predetermined response is received. As also shown in FIG. 5, a hold mode rental request may be removed 96 from the subset of requests being contacted if a "pass" response is received from a submitter rather than a "hold" response. This would indicate that renting the movie would not be convenient immediately but at a predetermined later time.

Figure 6:
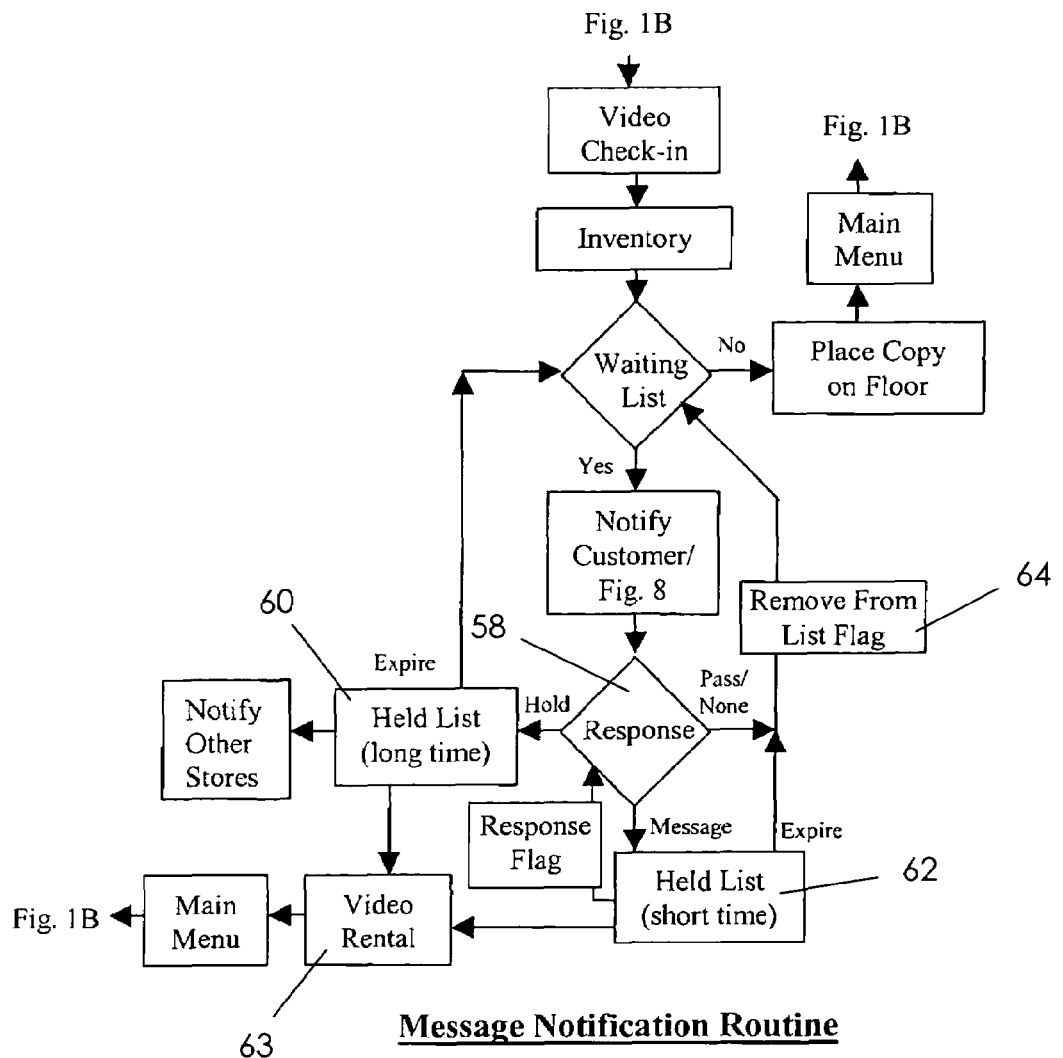
FIG. 6 is a flowchart of the program logic of a messaging notification module for a hold mode rental request.

The system includes a module for "message" notification as shown in FIG. 6. Message notification is substantially similar to the "instant" notification module described above except as specifically noted below. Again, a response to a contact attempt is evaluated 58. If a positive "hold" response is received when the submitter is notified, the movie title is held 60 (on a pickup hold list) for a predetermined but relatively long period of time, e.g. 2 days, until the submitter actually rents it 63 and takes it from the store. If personal contact is not made with the submitter, but the system is able to leave a message such as on an answering machine or e-mail, the movie title is held 62 for a relatively shorter period of time in which the submitter must pick up and rent the held movie. Of course, if a "pass" response or no response at all is received, the hold mode rental request 20 is removed 64 from the subset of requests being processed. And if a time period for holding the movie title expires, the system selects the next hold mode rental request and repeats this message contact process. It is understood that message notification could also be accomplished by the computer sending an appropriate e-mail or fax message. Therefore, it should be appreciated that the instant and message notification methods allow appropriate services to matched with appropriate customers and movie categories.

Figure 7:
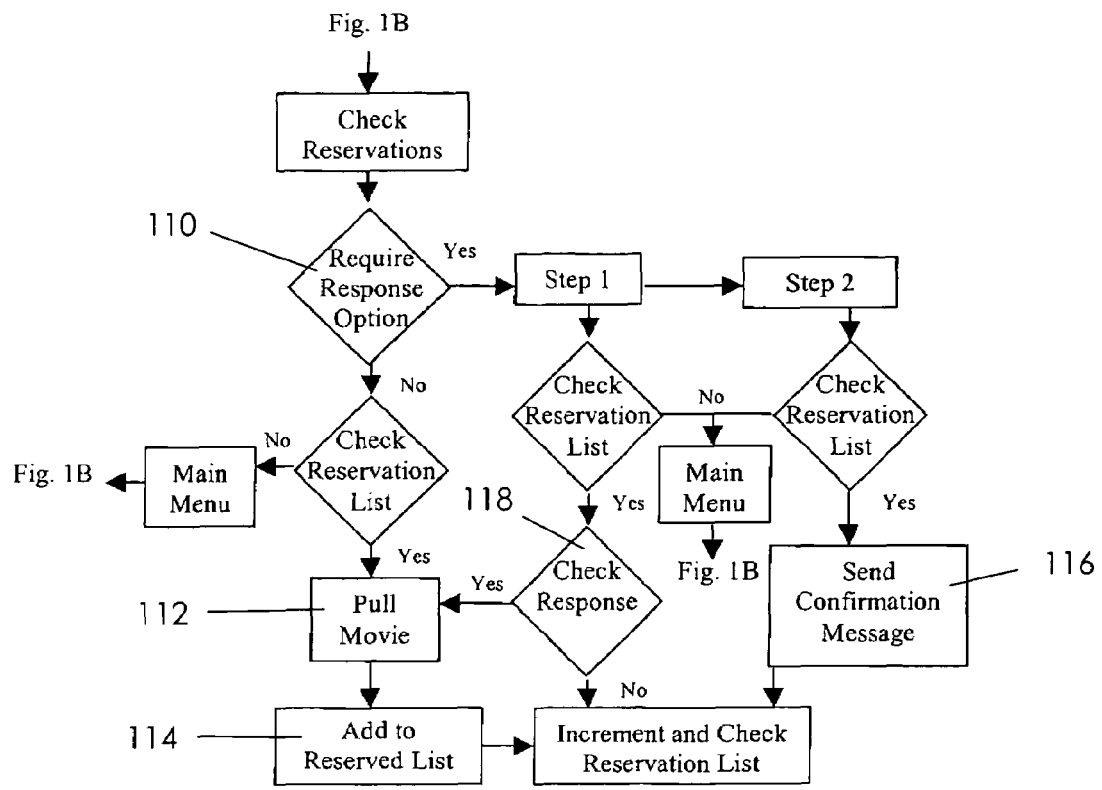
FIG. 7 is a flowchart of the program logic of a reserve mode notification module.

In the case of a reserve mode movie rental request 40, the system may generate an "unavailable" message 54 to be returned to the submitter according to the collected submitter contact information if the selected movie title will not be available at the primary store or partnering stores at the selected reservation time (FIG. 3). This availability may be determined by the system by comparing the requested reservation time with a scheduled return time of the movie title if it is presently rented or otherwise scheduled to be rented prior to the requested reservation time. However, if it is determined that the selected movie title will be available at the requested reservation time, then the reserve mode rental request is appended to the reservation list 56 (FIG. 3) and processed as more fully described below.

he system includes a reserve mode rental notification module as shown in FIG. 7. This module is automatically initiated a predetermined amount of time prior to a selected reservation time. More particularly, the system checks the reserve list 56 periodically and compares the current time with the selected reservation times of reserve mode rental requests in the list. If the selected/requested reservation time of a reserve mode rental request is within the predetermined time, the reservation processing module of FIG. 7 is initiated as described immediately below.

Each movie record includes a data field which allows store management or administration to set whether a reserve confirmation is required between the time a reserve mode rental request is made and the requested reservation time. For some popular movies, a rental store may seek a reserve confirmation so as to minimize the chances that the reserve requester will not actually rent the movie, thus decreasing rental volume. In this module, the system checks whether a confirmation is required 110. If no confirmation is required for a reserve mode rental request, then the system simply alerts a clerk to pull the movie 112 and hold it on a pickup reserve list 114 until the request submitter picks it up and rents it at the selected reservation time. If a confirmation is required, a confirmation message is sent 116 to the submitter with the calling machine 16 using associated confirmation information. The movie is pulled 112 and held for the submitter if, after checking the notification response 118, a positive response is received from the submitter. Therefore, the confirmation options enables a movie rental store operator to customize rental options to maximize the efficiency of movie turnaround and to maximize rental volume.

Figure 2:
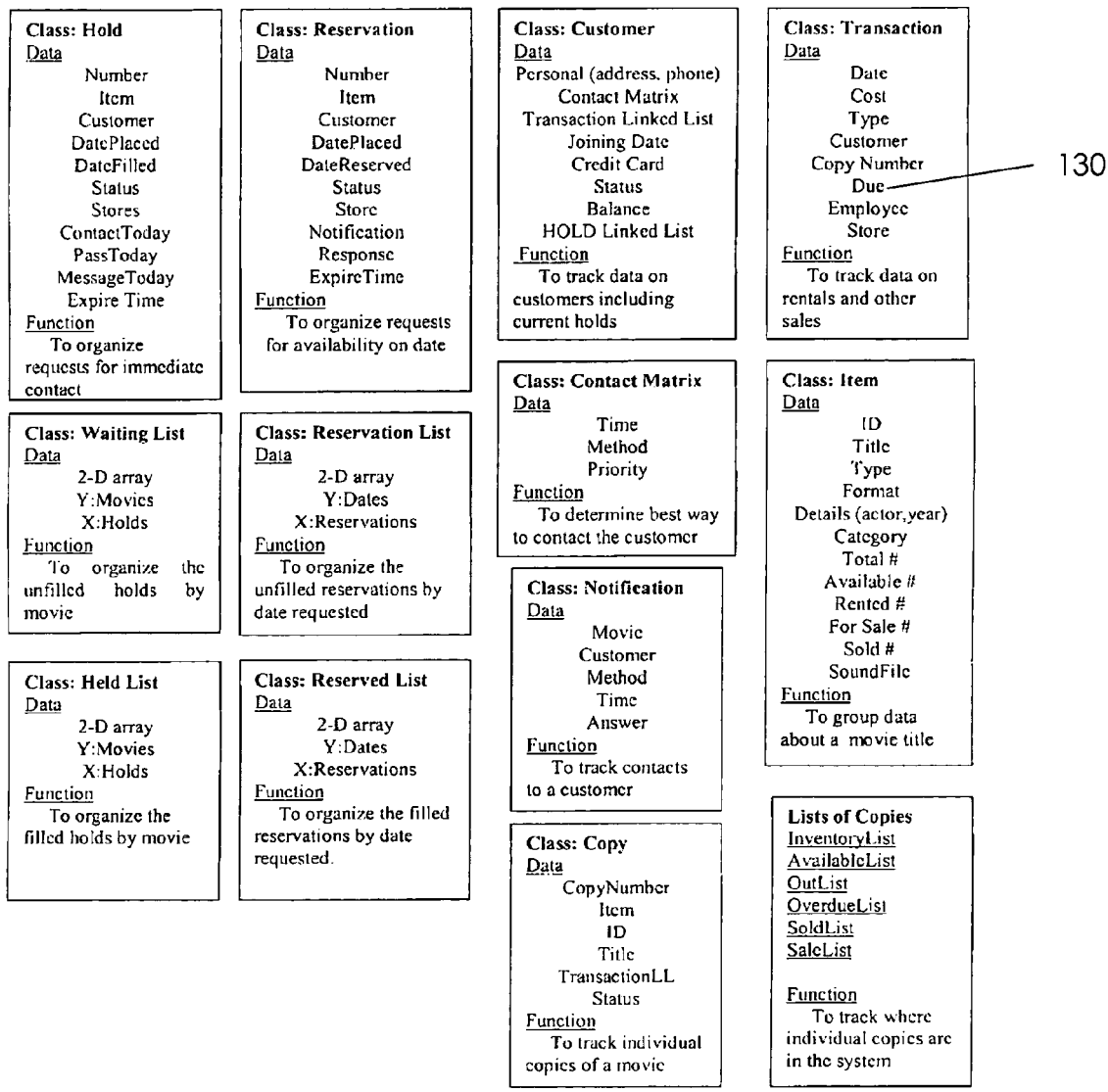
FIG. 2 is a schematic illustration of data types utilized by the system as in FIG. 1A.
Figure 9:
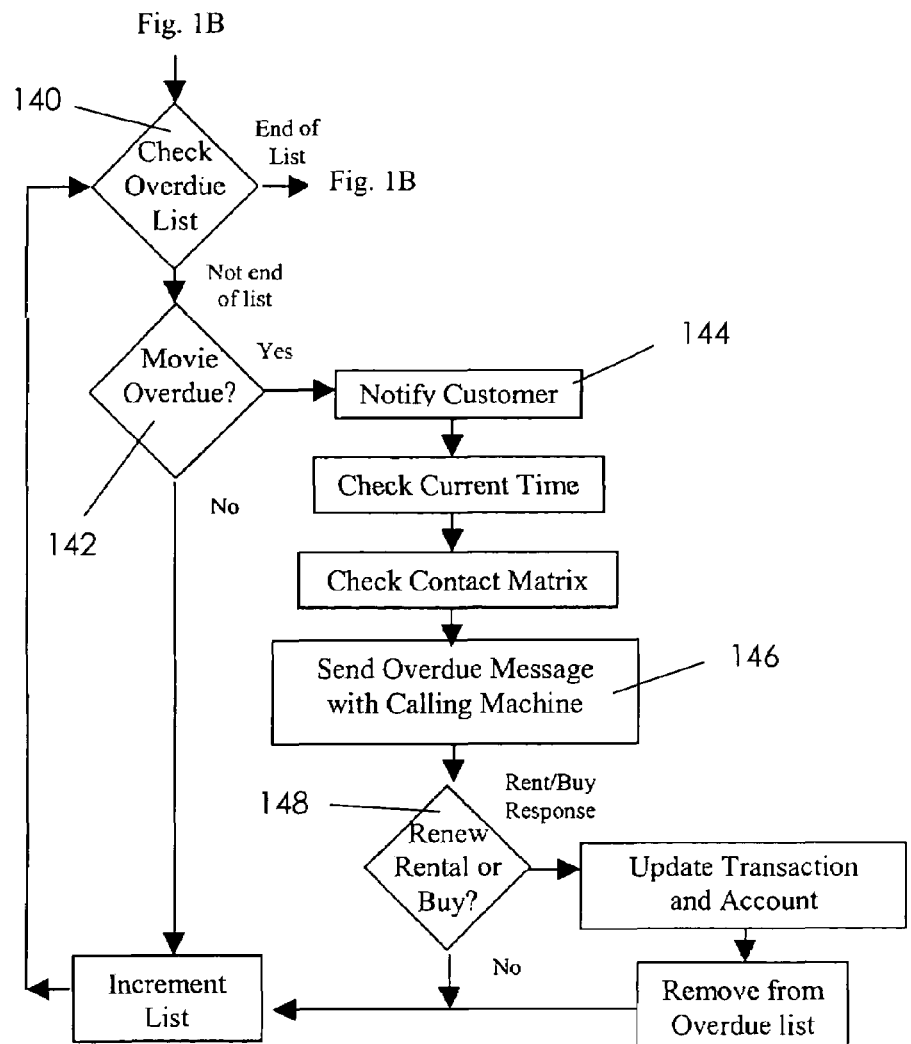
FIG. 9 is a flowchart of the program logic of an overdue movie checking and notification module.

The system may also include a barcode reader 120 or other similar video check-in device for scanning in a barcode on a returning movie (FIG. 1). The barcode reader 120 is electrically connected to the CPU such that the movie record associated with a returned movie may be updated. Further, the present system includes an automated overdue checking module (FIG. 9). Every rental transaction assigns a due date 130 (FIG. 2). The system automatically monitors a list of transactions such that rental records that have passed their respective due dates are selected and appended to an overdue list. The overdue list is then processed periodically 140 (FIG. 9). When a movie record is found to be overdue 142, the customer associated with that transaction is notified 144 using corresponding contact information, e.g. e-mail, or telephone. Accordingly, the calling machine 16 may initiate a coupling with a customer's downstream telephone as indicated at block 146 of FIG. 9. Optionally, the calling machine 16 may direct its playback module to query a customer's desire to renew its rental or to buy the movie 148. This process is repeated successively for each record in the overdue list.

Accordingly, it can be seen that the present invention provides an automated system having many options and modules for maximizing rental turnaround and convenience for both consumers and rental store proprietors. At the same time, the system minimizes the amount of time that a returned movie remains in inventory before being rented again. This is especially advantageous relative to popular movie titles. Consumers are able to make rental requests through the Internet or more conventional communication platforms and may choose a variety of rental mode options that best suit their needs or desires.

It is understood that while certain forms of this invention have been illustrated and described, it is not limited thereto except insofar as such limitations are included in the following claims and allowable functional equivalents thereof.

The invention claimed is:

1. An automated movie rental and notification system, comprising:
   a computer having a central processing unit (CPU) and connected to a wide area computer network;
   a movie database connected to said CPU and containing a hold list, a reservation list, and a plurality of movie records associated with movies available for rental, each movie record having at least a present inventory status data field;
   means connected to said CPU for receiving a rental request from a user, said rental request including a selected movie, a selected reservation mode, a selected reservation time, and user contact information;
   means in said CPU for accessing a movie record from said movie database corresponding to said selected movie;
   means in said CPU for determining from said present inventory data field of said accessed movie record if said selected movie is presently available or will be available by said selected reservation time;
   means in said CPU for appending said rental request to said hold list if said reservation mode is indicative of a hold mode;
   means in said CPU for appending said rental request to said reservation list if said reservation mode is indicative of a reserve mode and said selected movie will be available by said selected reservation time;
   a message database having a plurality of predetermined messages therein, each message being indicative of the availability of a particular movie associated with a corresponding movie database record;
   an automated telephone dialer and message playback unit connected to said CPU;

means in said CPU for successively selecting a next hold mode rental request from said hold list if said selected movie is presently available and directing said automated dialer to initiate a coupling with a downstream telephone according to respective user information of said next hold mode rental request until a predetermined response is received from a corresponding downstream telephone, said CPU directing a message from said message database corresponding to said next hold mode rental request to said playback unit for playback to said corresponding downstream telephone upon a successful coupling therewith;

means in said CPU for selecting a reserve mode rental request from said reservation list at a predetermined time prior to said selected reservation time of said reserve mode rental request and directing said automated dialer to initiate a coupling with a downstream telephone according to corresponding user information of said selected reserve mode rental request, said CPU directing a message from said message database corresponding to said next reserve mode rental request to said playback unit for playback to said downstream telephone upon coupling therewith;

wherein said means for determining if said selected movie is presently available or will be available at said selected reservation time includes querying the inventories of predetermined stores via said network;

a bar code reader electrically connected to said CPU for checking in a returned movie rental, each movie rental having a bar code associated with a respective movie database record;

means in said CPU for determining if said returned movie rental matches a selected movie of any hold mode rental request in said hold list;

means in said CPU for setting said present inventory data field of said respective movie database record to "available" if said returned movie does not match a selected movie of any hold mode rental request in said hold list;

means in said CPU for directing a store clerk to reshelve said returned movie; and means in said CPU for suspending said means for directing said automated dialer to initiate a coupling when said predetermined response is received from said corresponding downstream telephone.

2. The system as in claim 1 further comprising means in said CPU for removing said next reserve mode rental request from said reservation list if a predetermined response is not received from said downstream telephone upon coupling therewith.

3. The system as in claim 1 further comprising means in said CPU for notifying a user if said selected movie of said rental request will not be available at said reservation time.

4. A method for automated movie rental and notification, comprising:
providing a movie database containing a hold list, a reservation list, and a plurality of movie records associated with movie titles available for rental, each movie record having at least a present inventory status data field;
placing said movie database in a computer available for access by a plurality of users on a wide area computer network;
receiving a rental request from a user, said rental request including a selected movie title, a selected reservation mode, a selected reservation time, and user contact information;
appending said rental request to said hold list if said reservation mode is indicative of a hold mode;
determining from said present inventory data field of a respective movie database record corresponding to said selected movie title if said selected movie title is presently available;
if said selected movie title is presently available, selecting from said hold list a subset of rental requests according to said selected movie title, said subset of rental requests providing phone number data to an automated dialer for sequentially initiating communications with corresponding downstream telephones;
playing a message from a playback module upon establishing a communication with a respective downstream telephone that is indicative of a present availability of said selected movie title;
continuing to initiate said consecutive communications until a first predetermined response is received from a particular downstream telephone associated with a corresponding rental request;
receiving a returned movie title by scanning a bar code thereon associated with a corresponding movie database record, said bar code being scanned with a bar code reader electrically connected to said computer for communication with said movie database;
determining if said returned movie matches any of said selected movie titles of said hold mode requests in said hold list;
suspending said step of initiating consecutive communications for a predetermined amount of time following receiving said first predetermined response from said particular downstream telephone associated with said corresponding rental request; and
holding said selected movie title for said predetermined time for pickup by a user associated with said particular downstream telephone that provided said first predetermined response.

5. The method as in claim 4 further comprising:
determining from said present inventory data field of a respective movie database record corresponding to said selected movie title if said selected movie title of said rental request will be available at said selected reservation time; and
appending said rental request to said reservation list if said reservation mode is indicative of a reserve mode and said selected movie title will be available by said selected reservation time.

6. The method as in claim 5 further comprising:
selecting a reserve mode rental request from said reservation list a predetermined time before a corresponding selected reservation time;
contacting a submitter of said reserve mode rental request according to said user information associated therewith whereby to confirm said reserve mode rental request; and
removing said reserve mode rental request from said reservation list if a predetermined response is not received from said submitter.

7. The method as in claim 5 further comprising:
determining from said present inventory data field of a respective movie database record corresponding to said selected movie title of said rental request if said selected movie title of said rental request will be available at said selected reservation time; and
if said selected movie title will not be available at said selected reservation time, notifying a submitter of said rental request of a "not available" status.

8. The method as in claim 4 further comprising removing a respective rental request from said hold list upon receiving a second predetermined response from a corresponding downstream telephone indicative of a "pass".

9. The method as in claim 4 wherein said movie database includes an overdue list and each movie database record includes date rented, date due, and current renter information data fields;

said system further comprising:

determining from said date rented and said date due of a respective movie database record if a corresponding movie title is overdue; and appending said respective movie database record to said overdue list if said respective movie database record is overdue.

10. The method as in claim 9 further comprising:

selecting a next movie database record from said overdue list; and contacting a renter of a movie title corresponding to said next movie database record according to said customer information associated therewith, whereby to provide notice of an overdue status.

* * * * *